(12) United States Patent
Barnes et al.

(10) Patent No.: US 11,220,044 B2
(45) Date of Patent: Jan. 11, 2022

(54) METHODS FOR DEPOSITION AND FABRICATION OF 3D INTEGRATED COMPOSITE STRUCTURES

(71) Applicant: NORTHROP GRUMMAN SYSTEMS CORPORATION, Falls Church, VA (US)

(72) Inventors: Eric G. Barnes, Rancho Palos Verdes, CA (US); Pedro A. Gonzalez, Palmdale, CA (US); Todd L. Szallay, Long Beach, CA (US); Steven J. Floyd, Monterey Park, CA (US); Sung S. Park, Rancho Palos Verdes, CA (US); Brett G. Morham, Manhattan Beach, CA (US); Cody J. Brown, Edmonds, WA (US); Reese R. Allen, Bothell, WA (US); Ryan L. Bischoff, Seattle, WA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 215 days.

(21) Appl. No.: 16/380,066

(22) Filed: Apr. 10, 2019

(65) Prior Publication Data
US 2020/0324458 A1 Oct. 15, 2020

(51) Int. Cl.
*B29C 64/118* (2017.01)
*B29C 64/379* (2017.01)
(Continued)

(52) U.S. Cl.
CPC .......... *B29C 64/118* (2017.08); *B29C 64/209* (2017.08); *B29C 64/245* (2017.08);
(Continued)

(58) Field of Classification Search
CPC ... B29C 64/118; B29C 64/209; B29C 64/245; B29C 64/379; B29C 64/40; B29C 70/12;
(Continued)

(56) References Cited

U.S. PATENT DOCUMENTS 5,653,925 A 8/1997 Batchelder
6,471,800 B2 10/2002 Jang et al.
(Continued)

FOREIGN PATENT DOCUMENTS

WO 2018157210 A1 9/2018

OTHER PUBLICATIONS

PCT International Search Report of the International Searching Authority dated Jun. 29, 2020 for International Application No. PCT/US2020/025256 filed Mar. 27, 2020.
(Continued)

*Primary Examiner* — Matthew J Daniels
*Assistant Examiner* — Yunju Kim
(74) *Attorney, Agent, or Firm* — John A. Miller; Shumaker, Loop & Kendrick, LLP (57) ABSTRACT

A method for fabricating a composite part using a 3D printing machine. The method includes forming the part by depositing consecutive part layers each including rows of filaments made of a part material from the machine, where depositing each part layer includes non-sequentially depositing one set of a plurality of filaments so that a gap is formed between the filaments and then depositing any number of additional sets of filaments so that each adjacent pair of filaments in each additional set of filaments are non-sequentially deposited.

14 Claims, 5 Drawing Sheets

(51) Int. Cl.
  *B29C 64/245*  (2017.01)
  *B29C 64/209*  (2017.01)
  *B33Y 10/00*   (2015.01)
  *B33Y 30/00*   (2015.01)
  *B33Y 40/00*   (2020.01)

(52) U.S. Cl.
  CPC ............ *B29C 64/379* (2017.08); *B33Y 10/00* (2014.12); *B33Y 30/00* (2014.12); *B33Y 40/00* (2014.12)

(58) Field of Classification Search
  CPC ......... B29C 70/16; B33Y 10/00; B33Y 30/00; B33Y 40/00; B33Y 70/10
  USPC .......................................................... 264/349
  See application file for complete search history.

(56) References Cited

U.S. PATENT DOCUMENTS

| | | | |
|---|---|---|---|
| 7,648,759 B2 | 1/2010 | Hirawaki et al. |
| 8,603,385 B2 | 12/2013 | Costabeber |
| 9,126,367 B1 | 9/2015 | Mark et al. |
| 9,149,988 B2 | 10/2015 | Mark et al. |
| 9,156,205 B2 | 10/2015 | Mark et al. |
| 9,308,705 B2 | 4/2016 | Liou et al. |
| 9,327,453 B2 | 5/2016 | Mark et al. |
| 9,370,896 B2 | 6/2016 | Mark |
| 9,440,397 B1 | 9/2016 | Fly |
| 9,579,851 B2 | 2/2017 | Mark et al. |
| 9,688,028 B2 | 6/2017 | Mark et al. |
| 9,694,544 B2 | 7/2017 | Mark et al. |
| 9,776,376 B2 | 10/2017 | Swartz et al. |
| 9,815,268 B2 | 11/2017 | Mark et al. |
| 9,908,291 B2 | 3/2018 | Mech |
| 9,908,978 B2 | 3/2018 | Reese et al. |
| 9,956,725 B2 | 5/2018 | Mark et al. |
| 10,022,890 B2 | 7/2018 | La Forest et al. |
| 10,035,305 B2 | 7/2018 | La Forest et al. |
| 10,052,813 B2 | 8/2018 | Armijo et al. |
| 10,059,053 B2 | 8/2018 | Jaker et al. |
| 10,076,876 B2 | 9/2018 | Mark et al. |
| 10,173,410 B2 | 1/2019 | Nardiello et al. |
| 10,207,426 B2 | 2/2019 | Braley et al. |
| 2012/0073726 A1 | 3/2012 | Koeniger et al. |
| 2014/0061974 A1 | 3/2014 | Tyler |
| 2014/0232035 A1 | 8/2014 | Bheda |
| 2015/0367576 A1 | 12/2015 | Page |
| 2016/0031155 A1 | 2/2016 | Tyler |
| 2016/0176118 A1 | 6/2016 | Reese et al. |
| 2016/0332372 A1 | 11/2016 | Fryska et al. |
| 2017/0021565 A1 | 1/2017 | Deaville |
| 2017/0173868 A1 | 6/2017 | Mark |
| 2017/0198104 A1 | 7/2017 | Bheda et al. |
| 2017/0341300 A1 | 11/2017 | Rudolph et al. |
| 2017/0341301 A1 | 11/2017 | Van Tooren et al. |
| 2017/0368758 A1 | 12/2017 | Touma |
| 2018/0126667 A1 | 5/2018 | Wilenski et al. |

OTHER PUBLICATIONS

Peng, Yong, et al. "Synergistic reinforcement of polyamide-based composites by combination of short and continuous carbon fibers via fused filament fabrication." Composite Structures (2018).

Jiang, Delin, and Douglas E. Smith. "Anisotropic mechanical properties of oriented carbon fiber filled polymer composites produced with fused filament fabrication." Additive Manufacturing 18 (2017): 84-94.

Automated Fiber Placement Systems Overview, Konrad Kozaczuk, Transactions of the Institute of Aviation, No. 4 (245), pp. 52-59, Warsaw 2016 https://ilotedu.pl/prace_ilot/public/PDF/spis_zeszytow/245_2016/6.pdf.

Recent Developments in Automated Fiber Placement of Thermoplastic Composites, Zachary August, Graham Ostrander, John Michasiow, and David Hauber, Automated Dynamics, https://pdfs.semanticscholar.org/41 la/t6ac6cc3f7306fc1c75aef3e03eedec49 1c4.pdf.

METHODS FOR DEPOSITION AND FABRICATION OF 3D INTEGRATED COMPOSITE STRUCTURES

BACKGROUND

Field

This disclosure relates generally to a method for fabricating high performance 3D integrated composite structures and, more particularly, to a method for fabricating high performance 3D integrated composite structures that includes non-sequentially depositing filaments for each layer of the structure.

Discussion

Fused filament fabrication (FFF) is an additive manufacturing (AM) technology and is a technique used for 3D printing. More specifically, a FFF process provides a stock material to a heated nozzle, where it is extruded therefrom to be laid down layer by layer to build up a desired product, and where the molten polymer or fiber reinforced polymer material immediately begins to harden once it is extruded from the nozzle. The molten material may be generated from different feedstock, such as pre-shaped filaments or pellets.

Various materials may be used for FFF, such as high performance amorphous or semi-crystalline thermoplastics including polyetheretherketone (PEEK), polyetherketoneketone (PEKK), polyphenylsulfone (PPSF or PPSU), polyetherimide (PEI) and polyphenylene (PPS). Other materials that may be suitable for FFF include acrylonitrile butadiene styrene (ABS), polylactic acid (PLA), polycarbonate (PC), polyamide (PA), polystyrene (PS), lignin, rubber, carbon fibers, glass fibers, quartz fibers, Kevlar fibers, ultra-high molecular weight polyethylene (UHMWPE), Dyneema, high impact polystyrene (HIPS), nylon, high density polyethylene (HDPE) eutectic materials, plasticine, room temperature vulcanization (RTV) silicone, etc.

Traditional complex composite fabrication methods, such as autoclave cured hand lay-up, automated fiber placement, tape placement, etc. are labor intensive, expensive, require a long-lead and expensive tooling and typically requires talented fabrication technicians. Known composite additive manufacturing approaches are only capable of providing relatively low fiber volume, high porosity and low structural performance. Known additive manufacturing or 3D printing technologies are actually 2.5D, where the machine builds a layer in the x-y plane, then the machine stops, moves the build platform in the z-direction, and builds another layer in the x-y plane, thus it is a planar process. A true 3D fabrication process would build in the x, y and z directions concurrently. However, since there is no integrated additive manufacturing fabrication system that can build composites in a true 3D manner, there are significant limitations on the value of the current printing capability and these systems will never achieve high performance structural requirements because the fibers will typically not be aligned with the direction of the highest stresses on the part.

Known additive manufacturing 3D printing machines often employ a gantry style approach having an end-effector that lays down the additive material in the x-y plane. However, gantry style machine approaches make scalability, affordability and flexibility a challenge for a fabrication cell because there is a direct correlation between the size of the part being fabricated and the size of the gantry machine required, where the gantry machine is capable of only a single operation at one time. Very large parts require very large machines, thus driving the required footprint and machine cost. Robotic approaches provide greater flexibility and easier scale-up. For example, multiple robots can work within the same cell. Additionally, each robot can be mounted to a movable base that allows for repositioning at different locations within or around the cell. Robotic approaches allow for additional robot poses that increase the number of degrees of freedom, the ability to fabricate in 3D, and fabrication flexibility through multiple robots performing multiple tasks.

DETAILED DESCRIPTION OF THE EMBODIMENTS

The following discussion of the embodiments of the disclosure directed to methods for fabricating high performance 3D integrated composite structures is merely exemplary in nature, and is in no way intended to limit the disclosure or its applications or uses.

Figure 1:
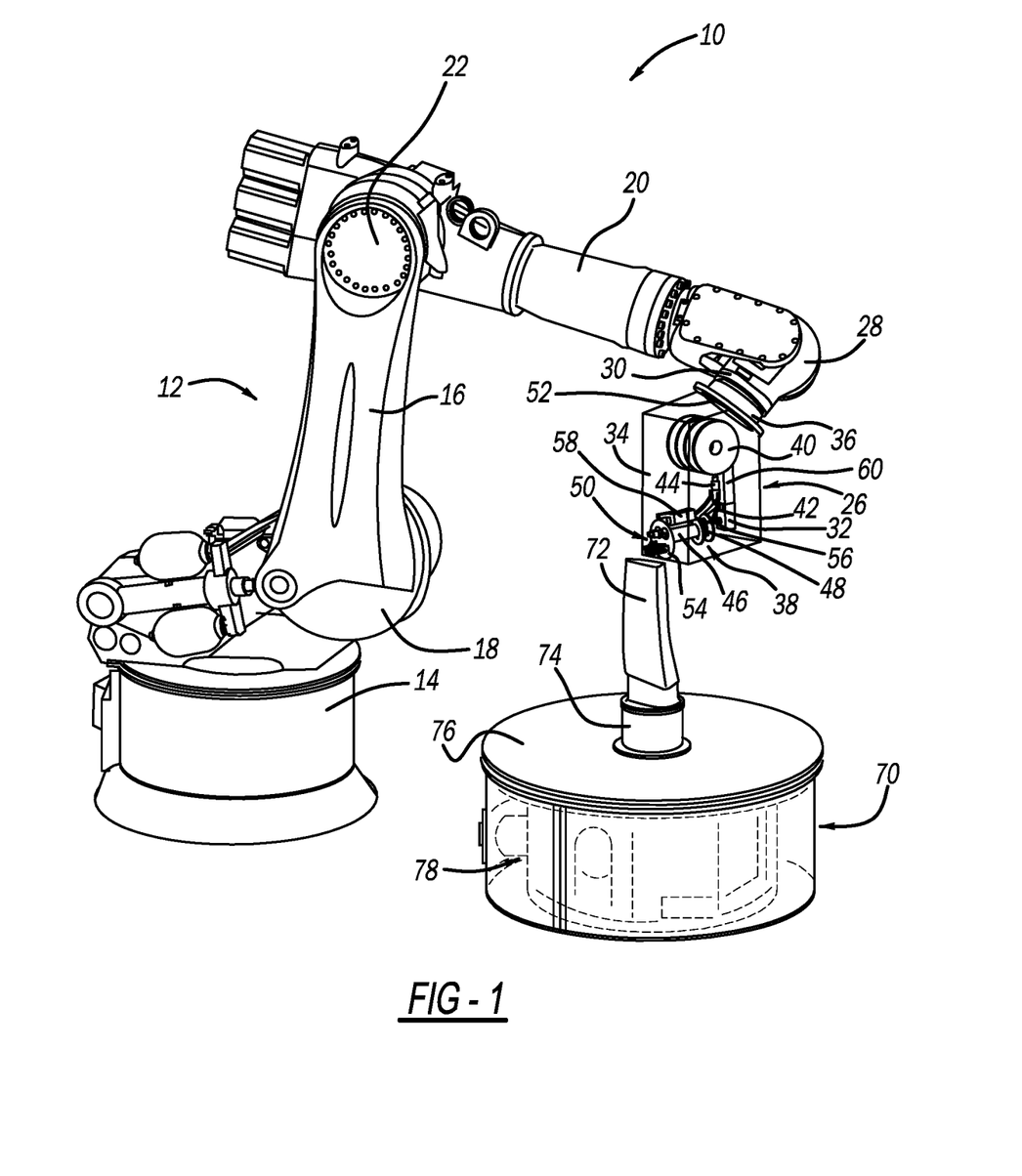
FIG. 1 is an isometric view of a 3D printing machine including a robot and an end-effector positioned relative to a part being fabricated on a build plate.

FIG. 1 is an isometric view of a 3D printing machine 10 including a robot 12 having a base portion 14, an extension arm 16 coupled to the base portion 14 by a rotary and pivot joint 18, and a working arm 20 coupled to the extension arm 16 opposite to the base portion 14 by an elbow pivot joint 22. An end-effector 26 is coupled to the working arm 20 at an angle opposite to the joint 22 by a pivot joint 28 having a coupling mechanism 30. The robot 12 is intended to represent any suitable positioning device for the end-effector 26. The end-effector 26 operates as a print-head assembly for laying down a molten fiber, filament, etc. for building a complex composite structure as described herein. Various end-effectors will be discussed herein that operate in certain manners and have certain features, and that can be attached to the robot 12. It is noted that during operation, the machine 10 may or may not be positioned within an oven (not shown) so that the temperature of the printing process and the ambient temperature surrounding the part is controlled.

The end-effector 26 includes an outer housing 34 and a rotatable connector 36 that is releasably and rotatably connected to the coupling mechanism 30, where the housing 34 is shown as being transparent to illustrate the various components therein. Those components include a number of spools 40, here three, on which a plurality of filaments 42 of various materials are wound, a motor 44 for selectively and independently drawing the filaments 42 off of the spools 40, a right angle gear box 32 coupled to a filament feed assembly 48 by a shaft 56, a rotary assembly 38 having a barrel 46 that is turned by an indexing motor 58 and through which the filaments 42 are drawn and melted, an end plate 54 mounted to an end of the barrel 46 and a nozzle assembly 50 that extends through the plate 54 and is part of the extruder module. The spools 40 can be mounted in the end-effector 26 as shown, or mounted remotely with the material being fed to the end-effector 26 through a tube (not shown). Alternately, the stock material can be provided by pellets instead of using the filament 42.

Figure 2:
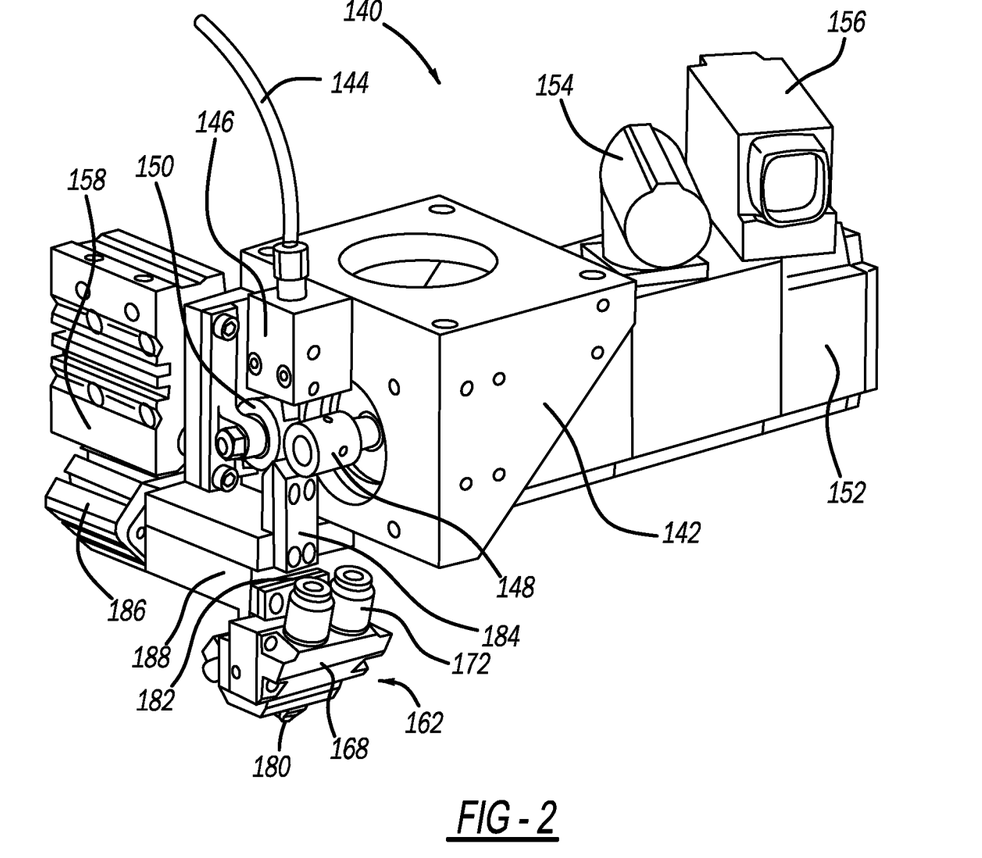
FIG. 2 is an isometric view of a continuous fiber extruder module that can be used in the end-effector shown in FIG. 1.

FIG. 2 is an isometric view of a continuous fiber extruder module 140 that is one non-limiting example of the type of extruder module that can be provided within the end-effector 26 and is rotated by the rotary assembly 38, where the module 140 is fitted with a mounting bracket 142 that allows it to be attached to the end-effector 26. The module 140 receives a filament 138 (see FIG. 4) through a filament guide tube 144, where the filament 138 passes through a filament guide tube mounting bracket 146 and then between a feed roller 148 and a clamp roller 150. The feed roller 148 is coupled to a feed motor 152 having a power connector 154 and an encoder 156, which provides the motive force to feed the filament 138 through the module 140. The clamp roller 150 is coupled to a clamp roller actuator 158 that presses the clamp roller 150 against the filament 138, thus pinching the filament between the feed roller 148 and the clamp roller 150 with a selected amount of force, which ensures that sufficient traction is created between the feed roller 148 and the filament 138 to allow the filament 138 to be fed without slipping.

Figure 3:
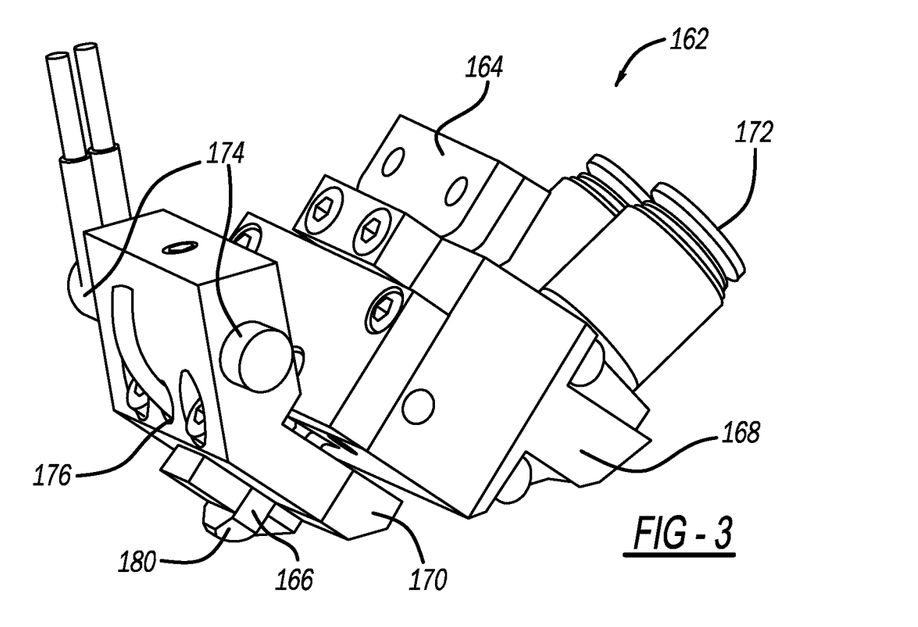
FIG. 3 is an isometric view of a nozzle assembly in the extruder module shown in FIG. 2.
Figure 4:
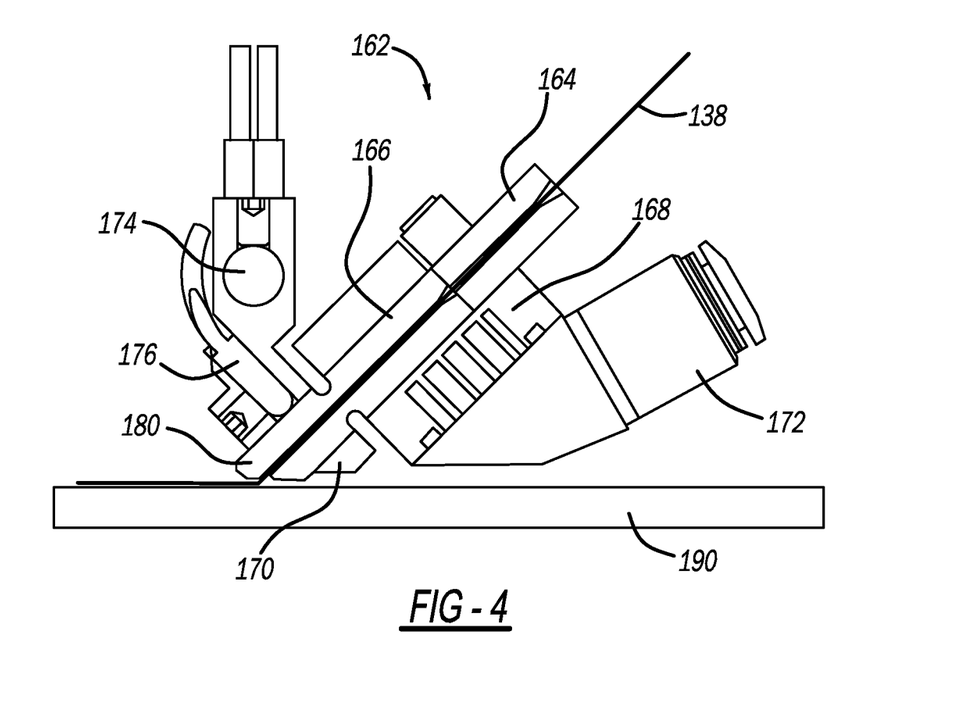
FIG. 4 a cross-sectional view of the nozzle assembly shown in FIG. 3 relative to a build-plate.

The filament 138 then passes through a filament guide 184 and into a nozzle assembly 162. FIG. 3 is an isometric view and FIG. 4 is a cross-sectional view of the nozzle assembly 162 separated from the module 140. The nozzle assembly 162 includes a filament inlet 164 and a nozzle 166, around which are clamped a cooling block 168 and a heating block 170, where the cooling block 168 receives a liquid coolant through a set of coolant hose connectors 172. The heating block 170 is heated by a heating element 174 and its temperature is monitored by a temperature sensor 176, which could be a thermocouple, thermistor, resistance temperature detector (RTD), or similar type of temperature sensor. This arrangement ensures that the filament 138 remains at a temperature that is less than the melting point of its polymer component until it arrives at a nozzle tip 180 of the nozzle 166. The filament 138 is then heated at the end of the nozzle 166 to melt the polymer so that the filament 138 will bond to a build surface 190 when it emerges from the nozzle tip 180.

A cutter 182 is provided between a filament guide 184 and the nozzle assembly 162 that is moved by a cutter actuator 186 and is constrained by a cutter guide 188. When the cutter actuator 186 is actuated, it moves the cutter 182 towards the filament 138 at high speed and with a selected amount of force, in a direction perpendicular to the filament feed direction, shearing the filament 138 against the underside of the filament guide 184 and cutting through the entire filament 138. This allows the filament 138 to be automatically cut to the appropriate length as it is being printed. The filament 138 is only extruded from the nozzle 166 in one direction, so the nozzle 166 must be rotated to different orientations in order to be able to extrude the filament 138 in different directions. This is different from conventional 3D printing nozzle designs, which are not sensitive to the rotation of the nozzle 166 and can print in any direction as long as the print direction is normal to the axis of the nozzle 166.

The continuous fiber-reinforced 3D printing process is sensitive to the orientation of the nozzle assembly 50. The machine overcomes some of this sensitivity by making the nozzle assembly 50 rotatable. Additionally, by making the nozzle assembly 50 rotatable relative to the rest of the end-effector 26, the direction of the filament 42 as it is extruded from the end-effector 26 can be controlled without needing to rotate the entire end-effector 26. The end-effector 26 may be relatively large and unwieldy compared to the rotary assembly 38, so being able to control the orientation of the extruder module independently of the orientation of the end-effector 26 significantly improves dexterity of the machine 10.

As mentioned above, the part that is being built by the printing process is formed on a build platform. In the design of the machine 10 a rotary circular table 70 is employed on which a part 72 being printed or fabricated is shown. An optional riser 74 is provided at a center of the table 70 and the part 72 is positioned on the riser 74. However, it is noted that in some designs, the riser 74 may not be needed. The end-effector 26 is shown positioned adjacent to the part 72 and is in the horizontal orientation. By providing the riser 74 on which the part 72 sits, the part 72 is separated some suitable distance from a top surface 76 of the table 70 so as to provide clearance between the end effector 26 and the table 70 that is desirable for effectively printing small-diameter parts. In one embodiment, the riser 74 is fabricated from a highly thermally conductive material, such as copper, so as to improve thermal transfer to the part 72 and maintain part thermal stability and adhesion of the part 72 to the surface of the riser 74. The riser 74 can be provided in different shapes, sizes and heights to be more effective for fabrication of parts having a wide range of geometries. A side of the table 70 is shown as being transparent to illustrate suitable components 78 therein that allow the table 70 to be rotated and allow the riser 74 to be heated.

Figure 5:
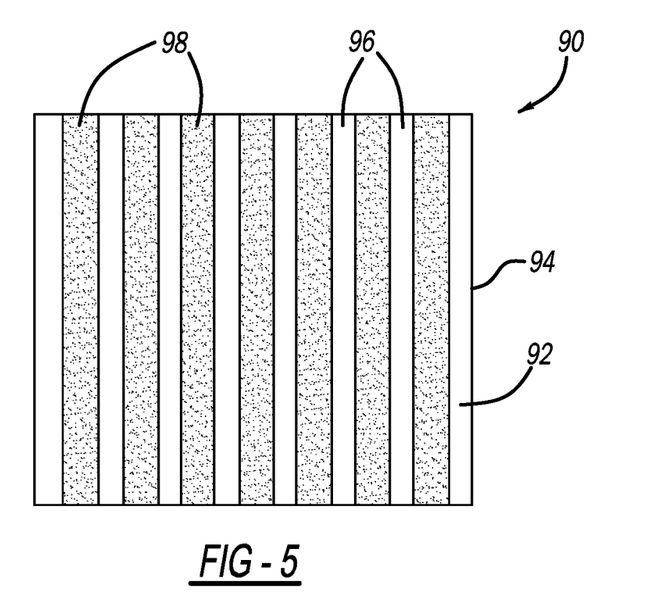
FIG. 5 is a top view of a part being fabricated by, for example, the 3D printing machine shown in FIG. 1, and showing filaments being deposited non-sequentially.

FIG. 5 is a top view of a part 90 being fabricated by an FFF process on a build plate (not shown), such as by the 3D printing machine 10 shown in FIG. 1. As discussed above, the FFF process deposits rows of adjacent filaments 92 to form layers 94 that are stacked on top of each other to form the part 90. Known 3D fabrication processes sequentially deposit each filament 92 directly adjacent to the previously deposited filament 92. There are required tolerances of the positional accuracy of the filaments 92 as they are being deposited, i.e., how far off the position of the filaments 92 can be from a desired location. These tolerances tend to pile up on top of each other as the filaments 92 are being deposited for a particular layer, which can create a slight overlap of the filaments 92. This overlapping of the filaments 92 when deposited sequentially can cause the error to accumulate and cascade through a layer. Eventually if enough overlap has accumulated there is no longer enough room on the layer 94 in the desired location to deposit the next filament 92. As will be discussed below, according to this embodiment of the disclosure, the part 90 is fabricated by non-sequentially depositing the filaments 92 for each part layer 94. By providing non-sequential depositing of the filaments 92, the tolerances tend to average out and tend not to build up on each other.

As illustrated in this embodiment, a first set of odd-numbered filaments 96 are deposited for a certain one of the layers 94, which defines rows of gaps between adjacent filaments 96 that are about one filament width apart. The fabrication process then deposits a second set of even-numbered filaments 98, shown as being shaded merely for illustration purposes, in the gaps between the filaments 96, where the first set of odd-numbered filaments 92 have already begun to harden, which better defines the gap therebetween. The first set of filaments 96 is referred to as odd-numbered filaments because the first deposited filament in the first set is deposited in row number one, the second deposited filament is deposited in row number three, etc. The second set of filaments 98 is referred to as even-numbered filaments because the first deposited filament in the second set is deposited in row number two, the second deposited filament is deposited in row number four, etc. Thus, instead of depositing the filaments 92 sequentially, where one filament 92 is deposited directly adjacent to the filament 92 that was previously deposited as was done in the prior art, this embodiment deposits the filaments 92 non-sequentially so that every other filament 92 is first deposited, and then filaments 92 are deposited in the gaps therebetween. It is noted that although this embodiment deposits the filaments non-sequentially by first depositing the odd-number of rows and then depositing the even-numbered rows, this is merely an example. Other embodiments could deposit the filaments non-sequentially in any suitable manner as long as gaps are provided between each set of filaments that are deposited at a particular time. This process provides a number of advantages including improving the reliability of the fabrication process, reducing the sensitivity of the process to fly height and variations in feedstock material linear density, a higher percentage fill, reduction in part porosity and an increase in part fiber volume.

The filaments 92 can be formed of any material suitable for the purposes discussed herein, such as the various thermoplastics and polymers mentioned above. In one non-limiting embodiment, the filaments 92 are continuous fiber filaments, such as continuous carbon fiber (CCF) filaments, that tend to be of higher strength that is desired for certain products, where each filament 92 has many continuous fibers that extend from one end of the filament 92 to the other end of the filament 92 and are encapsulated in a suitable polymer to provide the desired strength. Other suitable continuous fiber filaments include fibers of graphite, glass, Kevlar, quartz, etc. embedded within a suitable polymer. Additionally, any of these fibers can be chopped or sectioned so that they are not continuous from one end of the filament 92 to the other end of the filament 92, and are also enclosed within a suitable polymer, which tend to be of a lower strength than continuous fiber filaments. Typical widths of the filaments 92 are in the range of 3.5-7 mm and a typical thickness of the filaments 92 can be 0.25-0.5 mm.

As mentioned above, higher strength parts can be made by an FFF process using continuous fiber filaments. These continuous fiber filaments tend to have a high fiber volume and a lower amount of polymer in them than filaments having chopped or discontinuous fibers. However, the higher fiber volume and the reduced amount of polymer in a continuous fiber filament causes a certain level of dryness of the filament, which tends to reduce the adhesion between adjacent layers, which could cause defects and reduce the integrity and strength of the final part. The term "dryness" in this context refers to the relative lack of polymer content in the filament, not moisture content.

Figure 6:
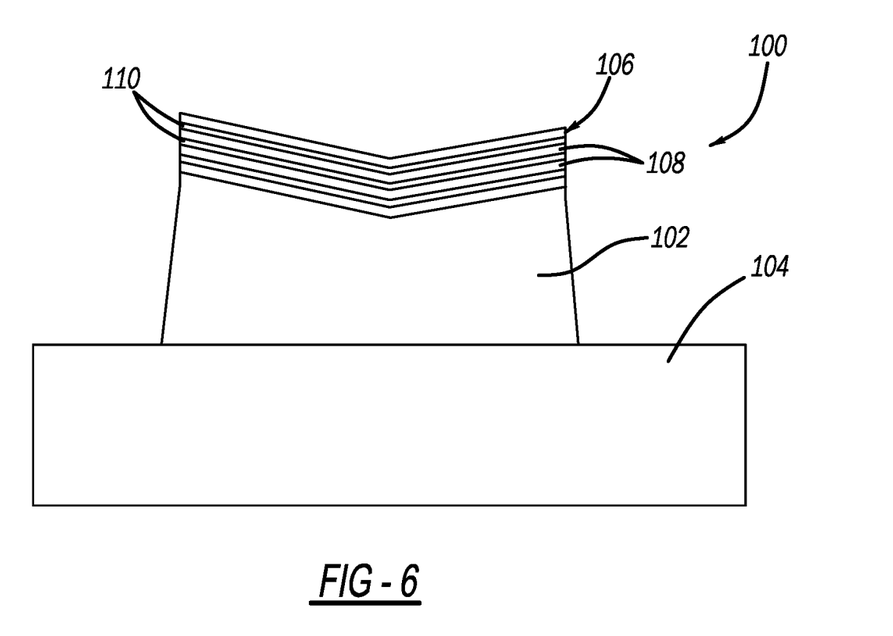
FIG. 6 is a side view of a part being fabricated by, for example, the 3D printing machine shown in FIG. 1, and showing alternating continuous fiber filament layers and polymer filament layers.

FIG. 6 is a side view of a part assembly 100 fabricated by an FFF process, such as by the 3D printing machine 10 shown in FIG. 1. The part assembly 100 includes a support structure 102 fabricated on a build-plate 104 and a part 106 fabricated on the support structure 102. The support structure 102 is fabricated by the same FFF process as the part 106, and can be formed of, for example, layers of pure polymer filaments or of polymer filaments including chopped or discontinuous fibers of the type discussed above. In order to increase the adhesion between the desired part layers, the present disclosure proposes an FFF process that fabricates the part layers in an alternating sequence of first layers 108 including filaments made of a desired material for the final part and second layers 110 including filaments made of a desired material to increase or enhance the adhesion between the layers 108 without significantly reducing the structural integrity of the final part. The filaments of one material can be provided, for example, by the first extruder module 66 in the extruder module 60, and the filaments of the other material can be provided the second extruder module 68 in the extruder module 60. In one non-limiting embodiment, the first layers 108 include continuous fiber filaments and the second layers 110 include pure polymer filaments or polymer filaments with discontinuous fibers. However, it is noted that this is merely for illustrative purposes in that the first layers 108 are generally strength layers and the second layers 110 are generally adhesion layers, which can be other materials than described above.

The thickness of the second layers 110 is minimized to the extent possible, such as 0.13 mm, or about half of the thickness of the first layers 108. Each layer 108 and 110 can be deposited in any suitable orientation relative to the other layers 108 and 110, such as 0°, 45°, 90°, 135°, etc. This FFF process provides a number of advantages including improved reliability of the FFF process, improved FFF process speed because the second layers 110 can be deposited more quickly than the first layers 108, improved interlayer adhesion, and a reduction in the permeability of the finished part.

Figure 7:
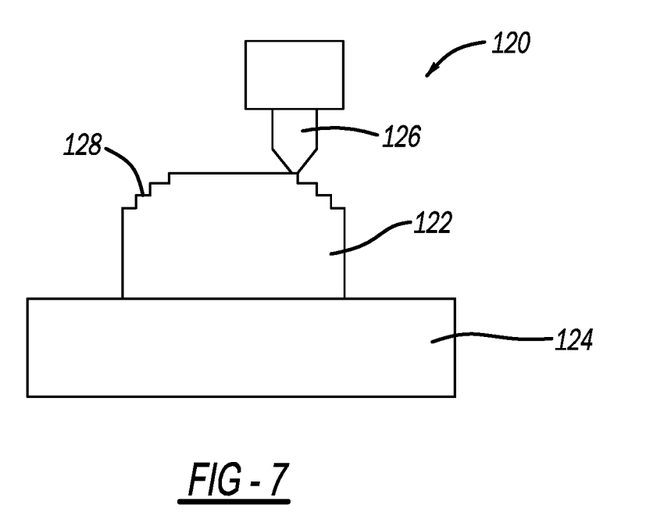
FIG. 7 is a side view of a support structure on which a part will be fabricated by, for example, the 3D printing machine shown in FIG. 1, and showing a support structure deposition nozzle.

FIG. 7 is a side view of a fabrication assembly 120 including a tooling or support structure 122 that has been fabricated by an FFF process, such as by the 3D printing machine 10 shown in FIG. 1, on a build-plate 124, as discussed above. A part (not shown) will be fabricated on the support structure 122 opposite to the build-plate 124. An FFF deposition nozzle 126 is shown relative to the structure 122 and is intended to represent the nozzle that fabricated the support structure 122, which would have a certain configuration for that purpose. The fabrication process of the support structure 122 would be such that surface imperfections, shown here as steps 128, would form between the separate layers in the support structure 122. The steps 128 reduce the accuracy of depositing the part (not shown) thereon and reduce the ability of removing the part from the support structure 122 without damaging it because the polymer material of the part gets into and is secured within various nooks and crannies within the support structure 122.

Figure 8:
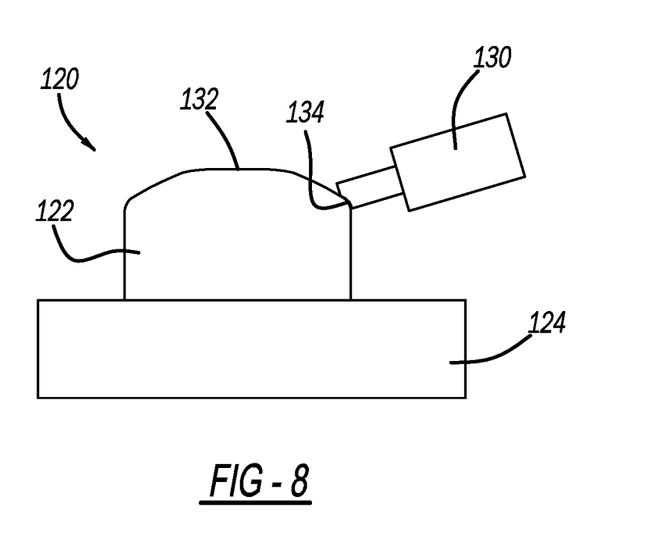
FIG. 8 is a side view of the support structure shown in FIG. 7, and showing a filament deposition nozzle smoothing a top surface of the support structure.

FIG. 8 is a side view of the fabrication assembly 120 showing the support structure 122 on the build-plate 124. According to this embodiment, prior to the part being fabricated on the support structure 122, a nozzle 130 that is used to deposit the filaments for the part is first heated and then used to smooth out the steps 128 to form a smoothed surface 132 on the support structure 122. The nozzle 130 is configured to have an indented or rounded corner 134 that allows the nozzle 130 to more easily provide the desired smoothing affect. In an alternate embodiment, a dedicated ironing tool (not shown) could be used instead of the nozzle 130 to smooth out the surface of the support structure 122. As above, the various filaments for the support structure 122 and the part can be formed of any material suitable for the purposes discussed herein, such as the various thermoplastics and polymers mentioned above. The filaments can be continuous fiber filaments or filaments having fibers that are chopped or sectioned so that they are not continuous from one end of the filament to the other end of the filament, and are also enclosed within a suitable polymer. This process provides a number of advantages including improved reliability of the FFF process, improved finish of the part surface after the support structure 122 is removed, and provide an increased effectiveness of solvent used to remove the support structure 122 by, for example, reducing inclusions of support material into the part layers and promoting clean delamination.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for fabricating a composite part using a 3D printing machine, said method comprising forming the part by depositing consecutive part layers each including rows of filaments made of a part material from the machine on a support structure, wherein depositing each part layer includes non-sequentially depositing one set of a plurality of filaments so that a gap is formed between the filaments and then depositing any number of additional sets of filaments so that each adjacent pair of filaments in each additional set of filaments are non-sequentially deposited, where the machine includes an end-effector comprising an outer housing with an obliquely-angled corner wall, the end-effector being mounted to an end joint of a robot arm via a rotatable connector secured to the obliquely-angled corner wall, said end-effector including a nozzle assembly rotatable relative to the end-effector via a rotary assembly inside the outer housing, said nozzle assembly being configured to deposit the filaments, and where the end-effector, the outer housing and the obliquely-angled corner wall are configured whereby an axis of rotation of the rotatable connector is non-parallel with an extrusion axis of the nozzle assembly such that the nozzle assembly is placeable at any position and orientation in three dimensions via a position and orientation of the end joint of the robot arm and a rotation angle of the rotatable connector, and a rotation angle of the rotary assembly.

2. The method according to claim 1 further comprising providing the support structure that the filaments are deposited on, wherein providing the support structure includes depositing consecutive support structure layers having rows of filaments made of a support structure material from the machine on a build-plate.

3. The method according to claim 2 wherein the support structure layers include filaments that have a pure polymer or chopped or discontinuous fibers combined with a polymer.

4. The method according to claim 1 wherein forming the part includes depositing a first set of a plurality of filaments for each layer that are spaced apart from each other so that a gap is formed between each adjacent pair of the filaments in the first set that is about a width of the filament and depositing a second set of a plurality of filaments for each layer that provides a filament in each gap between the filaments in the first set.

5. The method according to claim 4 wherein depositing a first set of a plurality of filaments for each layer includes depositing odd-numbered filaments and depositing a second set of a plurality of filaments for each layer includes depositing even-numbered filaments.

6. The method according to claim 1 wherein the part layers include filaments that have continuous fibers combined with a polymer.

7. The method according to claim 6 wherein the continuous fibers are continuous carbon fibers.

8. The method according to claim 6 wherein the continuous fibers are continuous fibers of one of graphite, quartz, glass or polyaramid.

9. The method according to claim 1 wherein the part layers include filaments that have chopped or discontinuous fibers combined with a polymer.

10. A method for fabricating a composite part using a 3D printing machine, said method comprising:
    forming a support structure by depositing consecutive support structure layers including rows of filaments made of a support structure material from the machine on a build-plate; and
    forming the part by depositing consecutive part layers including rows of filaments made of a part material from the machine on the support structure, wherein depositing each part layer includes depositing a first set of a plurality of filaments for each layer that are spaced apart from each other so that a gap is formed between each adjacent pair of the filaments in the first set that is about a width of the filament and depositing a second set of a plurality of filaments for each layer that provides a filament in each gap between the filaments in the first set,
    where the machine includes an end-effector comprising an outer housing with an obliquely-angled corner wall, the end-effector being mounted to an end joint of a robot arm via a rotatable connector secured to the obliquely-angled corner wall, said end-effector including a nozzle assembly rotatable relative to the end-effector via a rotary assembly inside the outer housing, said nozzle assembly being configured to deposit the filaments of the support structure material and the part material, and where the end-effector, the outer housing and the obliquely-angled corner wall are configured whereby an axis of rotation of the rotatable connector is non-parallel with an extrusion axis of the nozzle assembly such that the nozzle assembly is placeable at any position and orientation in three dimensions via a position and orientation of the end joint of the robot arm and a rotation angle of the rotatable connector, and a rotation angle of the rotary assembly.

11. The method according to claim 10 wherein the support structure layers include filaments that have a pure polymer or chopped or discontinuous fibers enclosed within a polymer.

12. The method according to claim 10 wherein depositing a first set of a plurality of filaments for each layer includes depositing odd-numbered filaments and depositing a second set of a plurality of filaments for each layer includes depositing even-numbered filaments.

13. The method according to claim 10 wherein the part layers include filaments that have continuous fibers combined with a polymer.

14. The method according to claim 10 wherein the part layers include filaments that have chopped or discontinuous fibers combined with a polymer.

\* \* \* \* \*